United States Patent
Washizu

[11] Patent Number: 5,154,450
[45] Date of Patent: Oct. 13, 1992

[54] CONNECTOR FOR CONNECTING THIN PIPE

[75] Inventor: Katsushi Washizu, Numazu, Japan

[73] Assignee: Usui Kokusai Sangko Kaisha Limited, Japan

[21] Appl. No.: 644,201

[22] Filed: Jan. 22, 1991

[30] Foreign Application Priority Data

Jan. 22, 1990 [JP] Japan .................. 2-12385

[51] Int. Cl.$^5$ .................................... F16L 39/00
[52] U.S. Cl. ............................. 285/319; 285/921
[58] Field of Search ...................... 285/319, 921

[56] References Cited

U.S. PATENT DOCUMENTS

| | | | |
|---|---|---|---|
| 4,111,530 | 9/1978 | Fuehrer et al. | 285/921 |
| 4,575,133 | 3/1986 | Nattel | 285/921 |
| 4,637,640 | 1/1987 | Fournier et al. | 285/319 |
| 4,730,856 | 3/1988 | Washizu | 285/319 |
| 4,895,396 | 1/1990 | Washizu | 285/319 |
| 4,913,467 | 4/1990 | Washizu | 285/319 |
| 4,915,420 | 4/1990 | Washizu | 285/319 |
| 4,944,537 | 7/1990 | Usui et al. | 285/319 |
| 4,989,905 | 2/1991 | Rajecki | 285/319 |
| 4,997,216 | 3/1991 | Washizu | 285/319 |
| 5,087,084 | 2/1992 | Gehring | 285/319 |
| 5,090,747 | 2/1992 | Kotake | 285/319 |

Primary Examiner—Eric K. Nicholson
Attorney, Agent, or Firm—Anthony J. Casella; Gerald E. Hespos

[57] ABSTRACT

There is disclosed a compact connector for stably connecting a metallic or resinous pipe or tube having a relatively small diameter less than about 20 mm, the pipe having an outwardly swelling annular wall. The connector comprises a connector body, seal members, a bush member, and a socket body fabricated independent of the connector body. The connector body has a small chamber in which the seal members and the bush member are inserted. The socket body has an annular cylindrical wall, arms extending circumferentially, and a pair of rectangular claw walls. The claw walls have tapering surfaces provided with openings at their rear ends. When the socket body is inserted in the connector body, the front surfaces of the claw walls are brought into resilient contact with the swelling annular wall of the pipe. The rear surfaces of the claw walls engage the rear end surface of the connector body.

4 Claims, 2 Drawing Sheets

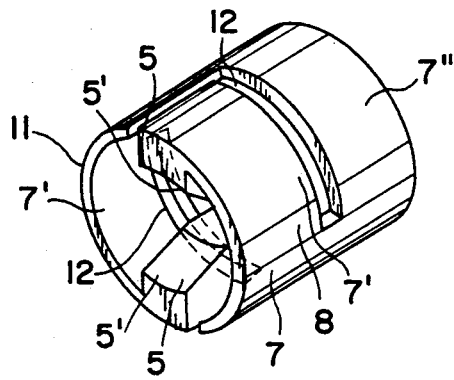
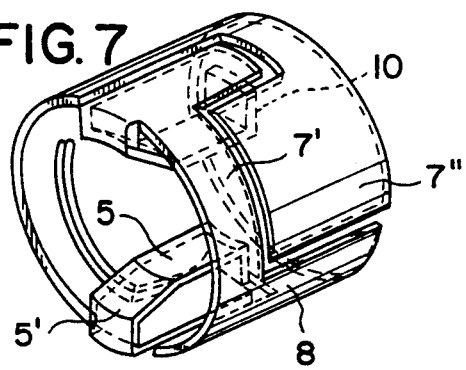
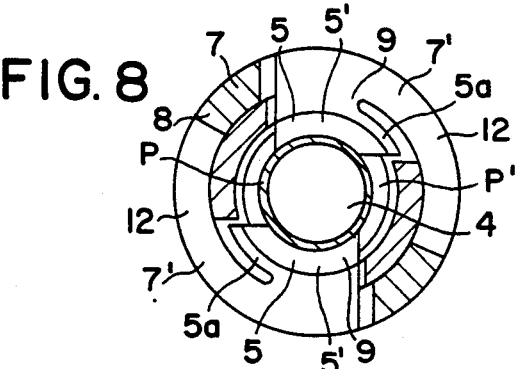
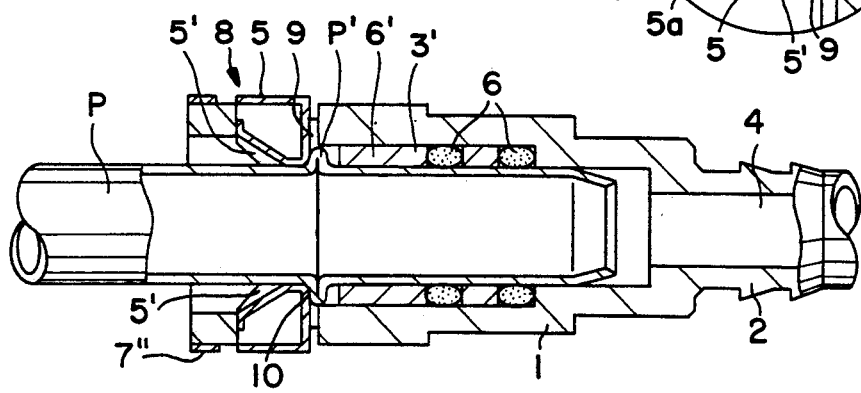
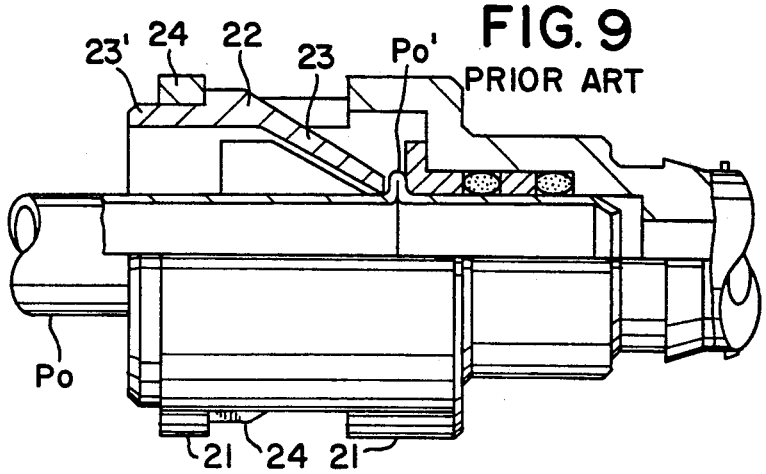

CONNECTOR FOR CONNECTING THIN PIPE

BACKGROUND OF THE INVENTION

1. Field of the Invention

The present invention generally relates to a connector for connecting a relatively thin metallic or resinous pipe or tube which has a diameter less than about 20 mm and which is mounted in an automobile, machine, apparatus, or the like to supply oil or air.

2. Description of the Prior Art

A conventional connector of this kind is shown in FIG. 9. The body of the connector is indicated by numeral 21. The body 21 of the connector has a support wall portion 21' at its rear end. A socket body 22 has a pair of resilient claw walls 23 which are inclined forwardly. The socket body 22 is provided with a hole extending axially through the body 22. The claw walls 23 protrude from the wall defining this hole and are located in the front of the socket body 22 as viewed in the direction of insertion of the socket body. The claw walls 23 have annular peripheral wall portions 23' at their rear ends. The annular wall portions 23' have stepped portions 24. A pipe $P_o$ having an annular swelling wall portion $P_o'$ is inserted in the socket body 22 in such a way that the claw walls 23 are pressed against the swelling wall portion $P_o'$ and that the stepped portions 24 engage the support wall portion 21'. In this way, the pipe $P_o$ is connected.

In this prior art structure, when the pipe $P_o$ is connected, the socket body 22 is inserted. At this time, the claw walls 23 are brought into engagement with the pipe $P_o$ with a snap. Because of this structure, socket body 22 must have a large diameter. The stepped portions 24 formed on the annular peripheral wall portions 23' in the rear of the socket body form shoulder portions, which in turn constitute a protruding annular wall portion 24'. When the stepped portions 24 are brought into engagement with the support wall portion 21', the annular protruding wall portion 24' is pushed inwardly and crushed to permit the pipe to pass inside the support wall portion 21'. Again, the socket body 22 must have a large diameter. Accordingly, the whole assembly including the connector body 21 is made larger in size. This makes it difficult to install the assembly in a narrow space. In addition, the large diameter makes the claw walls 23 long. As a result, the socket body is brought into resilient contact with the swelling wall portion $P_o'$ of the pipe $P_o$ with a smaller force. Also, permanent set in fatigue is produced. When vibration is kept applied to the socket for a long term, looseness occurs in the axial direction, thus deteriorating the airtightness. This will induce leakage, make the connection unstable, or introduce other problems.

SUMMARY OF THE INVENTION

It is an object of the invention to provide a compact connector which is used for connecting a thin pipe and can be installed in a narrow space and which connector comprises a socket body having a small diameter, claw walls having swelling wall portions that make resilient contact with a pipe with increased force and do not produce permanent set in fatigue, whereby the airtightness and stable connection are maintained sufficiently over a long term.

The above object is achieved by a connector for connecting a thin pipe, comprising: a connector body having a connecting cylindrical wall on the side of the front end of the body and a small chamber extending axially through the body, the small chamber having an enlarged portion, the cylindrical wall having a communication hole, the small chamber being in communication with the communication hole, the connector body further including a peripheral wall portion surrounding the enlarged portion, the peripheral wall portion having notches, the connector body forming a support wall at its rear end; annular seal members inserted in the small chamber formed in the body; a bush member mounted at the rear of the seal members; a socket body fabricated independent of the connector body and inserted in the enlarged portion of the small chamber, the socket body having a pair of resilient protruding claw walls located opposite to each other in the direction in which the socket body is inserted, the rear end wall of the socket body engaging said support wall; the claw walls being adapted to make resilient contact with an annular outwardly swelling wall portion formed on the pipe inserted in the connector body, the outwardly swelling annular wall portion being located close to the end of the pipe at which it is connected; the socket body having an annular cylindrical wall located in the rear of the socket body; arms continuous with the annular cylindrical wall and extending circumferentially of a peripheral wall, slits formed in the annular cylindrical wall portion to form the arms so as to leave the peripheral wall at least at one end, and a pair of substantially rectangular resilient claw walls formed inside the front ends of the arms; the annular cylindrical wall, the arms, and the resilient claw walls being formed as a unit; each resilient claw wall having a rear end portion in the rear of the corresponding arm and protruding substantially perpendicularly to the axis of the arm such that the rear end portions of the claw walls are located opposite to each other, the rear end portions having tapering surfaces having openings in their rear surfaces; whereby when the socket body is inserted and engaged in the connector body, the front surfaces of the claw walls located at the positions of the notches in the connector body are pressed against the annular swelling wall portion of the mounted pipe, and the rear surfaces of the claw walls engage said support wall.

In this structure, the arms of the socket body extend from the annular cylindrical wall portion circumferentially of the peripheral wall, leaving the peripheral wall at least at one end of the annular wall. The claw walls are substantially rectangular in form and protrude inwardly of the arms from the front ends of the arms. The claw walls extending from the arms can yield radially. Therefore, the diameter of the socket body can be made small. Hence, the whole assembly including the connector body can be rendered small. This permits the assembly to be installed in a narrow space. Also, the socket body can be easily inserted by pushing the claw wall portions from the rear side while slightly opening them. When the pipe is mounted, the socket body is inserted from the rear side. At this time, the claw walls bear against the tapering surfaces of the swelling wall portion and are spread outwardly. Then, the claw walls are returned to their original state by the resilience of the arms. Since the claw walls engage the swelling wall, the insertion is made quickly. When the socket body is engaged, the front surfaces of the claw walls located at the positions of the notches are pressed against the swelling wall portion. This structure allows the claw walls assuming a rectangular form to be shortened.

Thus, the claw walls make resilient contact with the swelling wall portion with a greater force. Furthermore, the claw walls are prevented from producing permanent set in fatigue, since the force needed to pull out the pipe does not act on the arms. Therefore, the airtightness can be maintained sufficiently over a long term. Also, the reliable and stable connection can be retained.

BRIEF DESCRIPTION OF THE DRAWINGS

FIG. 5 is a view similar to FIG. 4, but showing another socket body;

FIG. 6 is a cross section similar to FIG. 2, but showing another connector according to the invention;

FIG. 7 is a perspective view of the socket body of another embodiment of the invention;

FIG. 8 is a cross-sectional view similar to FIG. 3, but showing a still another connector according to the invention. and FIG. 9 is a partially cutaway cross section of the prior art connector, and in which it is connected.

DETAILED DESCRIPTION OF THE PREFERRED EMBODIMENTS

Figure 1:
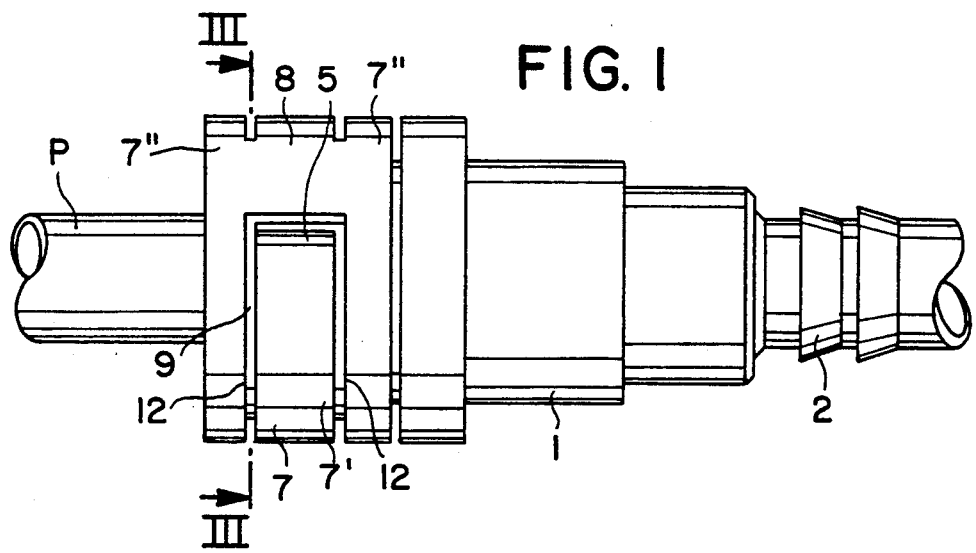
FIG. 1 is a partially cutaway plan view of a connector according to the invention, and in which a thin pipe is connected.
Figure 2:
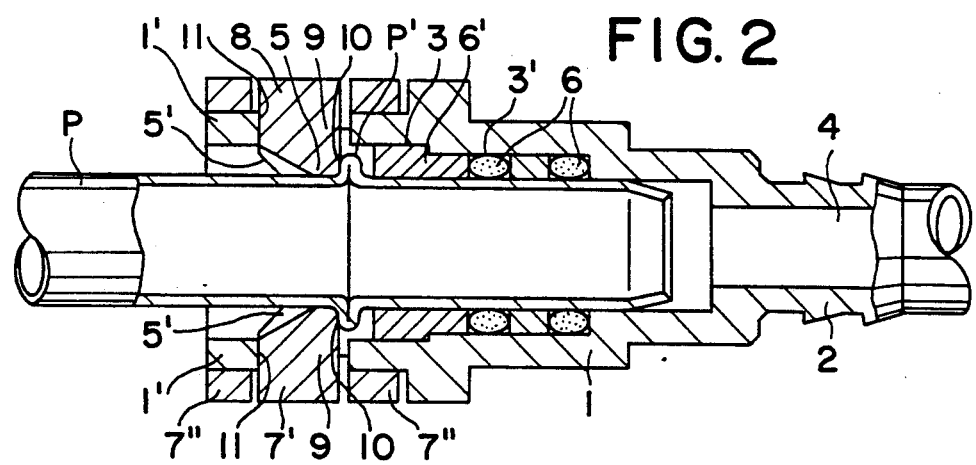
FIG. 2 is a vertical cross section of the connector shown in FIG. 1.
Figure 3:
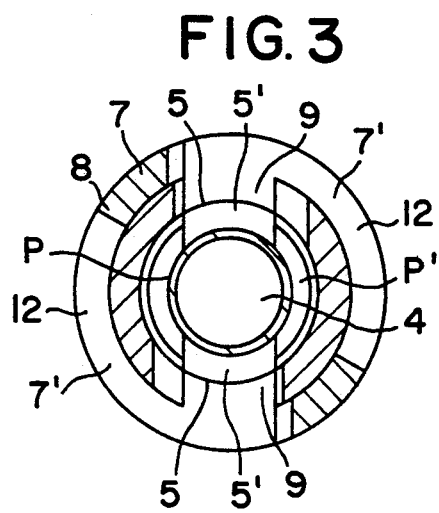
FIG. 3 is a cross-sectional view taken on line III—III of FIG. 1.
Figure 4:
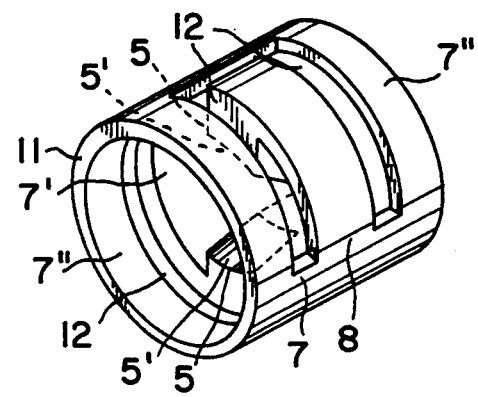
FIG. 4 is a perspective view of the socket body shown in FIG. 1.

Referring to FIGS. 1-7, the body of a connector according to the invention is indicated by reference numeral 1. The body 1 has a connecting cylindrical wall 2 on the front side. A resinous tube or rubber hose (not shown) is connected to this cylindrical wall 2 which is provided with a communication hole 4 extending along the axis of the body. The body 1 is provided with a small chamber 3' continuous with the communication hole 4. An enlarged chamber 3 which is preferably stepped is formed in the body 1 at the rear of the small chamber 3'. The diameter of the enlarged chamber 3 is larger than that of the small chamber 3'. Notches 9 are formed in the peripheral wall portion defined by the enlarged chamber. A support wall 1' is formed at the rear end of the peripheral wall portion. Annular resilient members 6 made from rubber or other similar material are inserted in the small chamber 3' via spacers. A bush member 6' which is preferably stepped is inserted at the rear of the resilient members 6.

A socket body 8 is made from a resilient material such as a resin and inserted into the rear side of the stepped outer surface formed by the connector body 1. The socket body 8 has an annular cylindrical wall 7 installed on a pipe and arms 7' extending circumferentially of the peripheral wall. The arms 7' are provided with slits 12 so as to leave a peripheral wall 7" at least at one end. The arms have rear end portions which protrude substantially at right angles to the axis of the socket body inwardly of the front ends of the arms. The socket body 8 further includes a pair of claw walls 5 each of which takes the form of a block. The cylindrical wall 7' and the claw walls 5 are formed integrally. The claw walls 5 form tapering surfaces 5' which are provided with openings in their rear surfaces. An outwardly swelling wall portion P' is formed on a pipe P close to the end of the pipe at which it is connected. When the pipe P is connected, the claw walls 5 cause the rear end portions of the arms 7' to bear against the annular swelling wall P' of the pipe.

When the socket body 8 inserted in the connector body 1 is engaged, the front surfaces 10 of the claw walls 5 located in the positions of the notches 9 in the connector body are pressed against the annular swelling wall P' of the mounted pipe P. The rear surfaces 11 of the claw walls 5 engage the support wall 1' at the locations of the notches 9.

As shown in FIGS. 6 and 7, the rear side of the outer surface of the connector body 1 on which the socket body 8 is installed is not required to be stepped. In the above example, the socket body 8 is made from a resin. It is also possible to fabricate the socket body out of a spring material such as spring steel, SUS material, or phosphor bronze by stamping. In this case, the socket body 8 can be made thinner than the case in which the socket body is made from a resin. Therefore, the diameter of the socket body 8 is made small. Hence, the whole assembly can be rendered more compact.

Where a material in the form of a flat sheet or plate is used as shown in FIGS. 6 and 7, the material is bent so as to form the tapering surfaces 5'. As a result, the whole structure is shaped into a substantially rectangular form.

FIG. 8 shows a still another embodiment of the connector wherein each of the claw walls 5 is provided with an extension 5a protruded in the peripheral direction of the pipe P from the side face near the end portion of the claw wall so that the contact area of each of the support wall 1' and the swelling wall portion P' with the claw walls may be increased. With the provision of the extensions 5a, when a force to pull out the pipe P is applied, a turning moment is prevented from being applied the claw wall 5 so as to check an unexpected release of the arms 7'.

As described thus far, in the connector for connecting the thin pipe, the socket body 8 is inserted in the annular cylindrical wall 7 which has the arms 7' and a pair of substantially rectangular claw walls 5. The arms 7' extend circumferentially of the peripheral wall so as to leave the annular wall 7" at least at one end. The claw walls 5 protrude inwardly of the front ends of the arms 7'. The claw walls of the arms 7' can radially yield. When the socket body 8 is inserted, the engaging surfaces 10 are pressed against the swelling wall portion P' at the locations of the notches 9. The claw walls 5 are substantially rectangular in form and short. Because of this structure, the diameter of the socket body 8 can be made small. Consequently, the whole assembly including the connector body 1 is made compact. The assembly can be easily installed in a narrow space without difficulty. The insertion can be performed easily by pushing it from the rear side while slightly opening the claw walls 5. Furthermore, the structure of the claw walls 5 increases the forces with which the claw walls make resilient contact with the swelling wall portion P'. The claw walls are prevented from producing permanent set in fatigue, because the force to pull out the pipe does not act on the arms. As a result, the airtightness can be maintained sufficiently over a long term. The reliable stable connection can be retained. In this way, the novel connector for connecting a thin pipe yields various quite useful advantages.

What is claimed is:

1. A connector for connecting a thin pipe, said pipe having a connecting end and an outwardly swelling annular wall portion spaced from said end, said connector comprising:

a connector body having opposed front and rear ends, a communication hole extending rearwardly into the front end of the connector body, a peripheral wall extending forwardly from the rear end of the connector body and defining at least one chamber extending forwardly into the rear end of the connector body and communicating with the communication hole, the peripheral wall including an inner surface defining the chamber and an opposed outer surface opposed notches extending through the peripheral wall from the outer surface, to the inner surface at locations spaced forwardly from the rear end of the connector body, each said notch defining a forwardly facing radially aligned support surface on the peripheral wall, and a rearwardly facing surface;

annular seal members disposed in the chamber for sealing engagement around portions of the pipe intermediate the connecting end thereof and the outwardly swelling annular wall portion;

a bush member mounted in the connector body rearwardly of the seal members; and a unitarily formed socket body having a cylindrical wall slidably disposed over the peripheral wall of the connector body, a pair of resiliently deflectable arms extending circumferentially from opposed locations of the socket body and engaging the outer surface of the peripheral wall of the connector body, blocks defined on deflectable ends of the respective arms and extending into the respective notches of the connector body, each said block including a radially aligned rear surface engaged with the forwardly facing support surface of the corresponding notch, a radially aligned front surface adjacent the rearwardly facing surface of notch for axially positioning the socket body on the connector body and extending into the chamber for engagement with the outwardly swelling annular wall of the pipe, and a rearwardly and inwardly facing tapering wall extending between the front and rear surfaces of the corresponding block, whereby the blocks and the corresponding arms deflect outwardly in response to forces exerted by the outwardly swelling annular wall of the pipe on the tapering surface of the block during insertion of the pipe into the connector body, and whereby the engagement of the front and rear surfaces of each said block with the outwardly swelling annular wall of the pipe and the support surface of the connector body respectively securely retains the pipe in the connector body.

2. The connector of claim 1, wherein said socket body is made from a resin.

3. The connector of claim 1, wherein said socket body is fabricated out of a spring material taking the form of a flat plate or sheet by stamping.

4. The connector of claim 3, wherein said spring member consists of a spring steel, SUS material, or phosphor bronze.

* * * * *